US011538180B2

(12) United States Patent
Henry et al.

(10) Patent No.: US 11,538,180 B2
(45) Date of Patent: Dec. 27, 2022

(54) SYSTEMS AND METHODS FOR DETERMINING RESIDUE LENGTH WITHIN A FIELD

(71) Applicant: CNH Industrial Canada, Ltd., Saskatoon (CA)

(72) Inventors: James W. Henry, Saskatoon (CA); Christopher Nicholas Warwick, Hertfordshire (GB); David John Powell, Cambridge (GB)

(73) Assignee: CNH Industrial Canada, Ltd., Saskatoon (CA)

( * ) Notice: Subject to any disclaimer, the term of this patent is extended or adjusted under 35 U.S.C. 154(b) by 0 days.

(21) Appl. No.: 17/174,936

(22) Filed: Feb. 12, 2021

(65) Prior Publication Data
US 2022/0262027 A1 Aug. 18, 2022

(51) Int. Cl.
*G06T 7/60* (2017.01)
*G06T 7/70* (2017.01)
*G06V 20/56* (2022.01)
*G06K 9/62* (2022.01)
(Continued)

(52) U.S. Cl.
CPC .............. *G06T 7/60* (2013.01); *A01B 69/001* (2013.01); *G06K 9/627* (2013.01); *G06T 7/70* (2017.01); *G06V 10/28* (2022.01); *G06V 20/56* (2022.01); *G06T 2207/20212* (2013.01); *G06T 2207/30188* (2013.01)

(58) Field of Classification Search
CPC ... G06T 7/60; G06T 7/70; G06T 2207/20212; G06T 2207/30188; G06V 10/28; G06V 20/56; A01B 69/001; G06K 9/627
See application file for complete search history.

(56) References Cited

U.S. PATENT DOCUMENTS 9,258,550 B1 2/2016 Sieracki et al.
2014/0297546 A1 10/2014 Birdwell et al.
2014/0301607 A1 10/2014 Anderson et al.
(Continued)

FOREIGN PATENT DOCUMENTS

WO WO 2020/039322 2/2020

OTHER PUBLICATIONS

Owen, Dylan C., et al. "Measuring soil coverage using image feature descriptors and the decision tree learning algorithm." Biosystems Engineering 196 (2020): 112-126. (Year: 2020).*

(Continued)

Primary Examiner — Vu Le
Assistant Examiner — Tracy Mangialaschi
(74) Attorney, Agent, or Firm — Rebecca Henkel; Rickard DeMille

(57) ABSTRACT

A method for determining residue length within a field includes receiving, with a computing system, a captured image depicting an imaged portion of the field from one or more imaging devices. Furthermore, the method includes determining, with the computing system, an image gradient orientation at each of a plurality of pixels within the captured image. Additionally, the method includes identifying, with the computing system, a residue piece present within the image portion of the field based at least in part on the determined image gradient orientations. Moreover, the method includes determining, with the computing system, a length of the identified residue piece.

18 Claims, 9 Drawing Sheets

(51) Int. Cl.
*A01B 69/00* (2006.01)
*G06V 10/28* (2022.01)

(56) References Cited

U.S. PATENT DOCUMENTS

| | | |
|---|---|---|
| 2015/0305224 A1 | 10/2015 | Casper et al. |
| 2016/0134844 A1* | 5/2016 | Casper .................. H04N 7/181 348/135 |
| 2017/0112043 A1 | 4/2017 | Nair et al. |
| 2018/0310474 A1 | 11/2018 | Posselius et al. |
| 2019/0064363 A1 | 2/2019 | Redden et al. |
| 2019/0236359 A1 | 8/2019 | Posselius |
| 2019/0261565 A1 | 8/2019 | Robertson et al. |
| 2019/0377986 A1 | 12/2019 | Ferrari et al. |
| 2019/0392573 A1 | 12/2019 | Ferrari et al. |

OTHER PUBLICATIONS

Riegler-Nurscher, Peter, et al. "A machine learning approach for pixel wise classification of residue and vegetation cover under field conditions." biosystems engineering 169 (2018): 188-198. (Year: 2018).*

Windrim, Lloyd, et al. "Automated mapping of woody debris over harvested forest plantations using uavs, high-resolution imagery, and machine learning." Remote Sensing 11.6 (2019): 733. (Year: 2019).*

Windrim et al., "Automated Mapping of Woody Debris Over Harvested Forest Plantations Using UAVs. High-Resolution Imagery, and Machine Learning", Dated Mar. 26, 2019, (29 pages) https://www.mdpi.com/2072-4292/11/6/733.

Extended European Search Report for corresponding EP Application No. 22156198 dated Jul. 15, 2022 (7 pages).

* cited by examiner

SYSTEMS AND METHODS FOR DETERMINING RESIDUE LENGTH WITHIN A FIELD

FIELD OF THE INVENTION

The present subject matter relates generally to the acquisition and analysis of surface condition data associated with an agricultural field and, more particularly, to systems and methods for determining residue length within an agricultural field.

BACKGROUND OF THE INVENTION

Crop residue generally refers to the vegetation (e.g., straw, chaff, husks, cobs) remaining on the soil surface following the performance of a given agricultural operation, such as a harvesting operation or a tillage operation. For various reasons, it is important to maintain a given amount of crop residue within a field following an agricultural operation. Specifically, crop residue remaining within the field can help in maintaining the content of organic matter within the soil and can also serve to protect the soil from wind and water erosion. However, in some cases, leaving an excessive amount of crop residue within a field can have a negative effect on the soil's productivity potential, such as by slowing down the warming of the soil at planting time and/or by slowing down seed germination. Additionally, the length or size of the pieces of residue within the field may affect the soil's productivity potential. As such, the ability to monitor and/or adjust the amount and/or length of crop residue remaining within a field can be very important to maintaining a healthy, productive field, particularly when it comes to performing tillage operations.

In this respect, systems and methods have been developed that estimate the residue length within an agricultural field from images captured of the field. While such methods generally work well, further improvements are needed. For example, the accuracy of these systems and methods of determining residue length may suffer in certain ambient lighting conditions (e.g., in direct sunlight and/or shadows) and when certain colors of soil and/or residue are present within the field (e.g., when the soil and residue have similar colors).

Accordingly, an improved system and method for determining residue length within an agricultural would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a method for determining residue length within a field. The method includes receiving, with a computing system, a captured image depicting an imaged portion of the field from one or more imaging devices. Furthermore, the method includes determining, with the computing system, an image gradient orientation at each of a plurality of pixels within the captured image. Additionally, the method includes identifying, with the computing system, a residue piece present within the image portion of the field based at least in part on the determined image gradient orientations. Moreover, the method includes determining, with the computing system, a length of the identified residue piece.

In another aspect, the present subject matter is directed to a system for determining residue length within a field. The system includes an imaging device configured to capture images of a field and a computing system communicatively coupled to the imaging device. In this respect, the computing system includes a processor and associated memory, with the memory storing instructions that, when implemented by the processor, configure the computing system to receive a captured image depicting an imaged portion of the field from one or more imaging devices. Furthermore, the computing system is configured to determine an image gradient orientation at each of a plurality of pixels within the captured image. Moreover, the computing system is configured to identify a residue piece present within the image portion of the field at least in part based on the determined image gradient orientations and determine a length of the identified residue piece.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
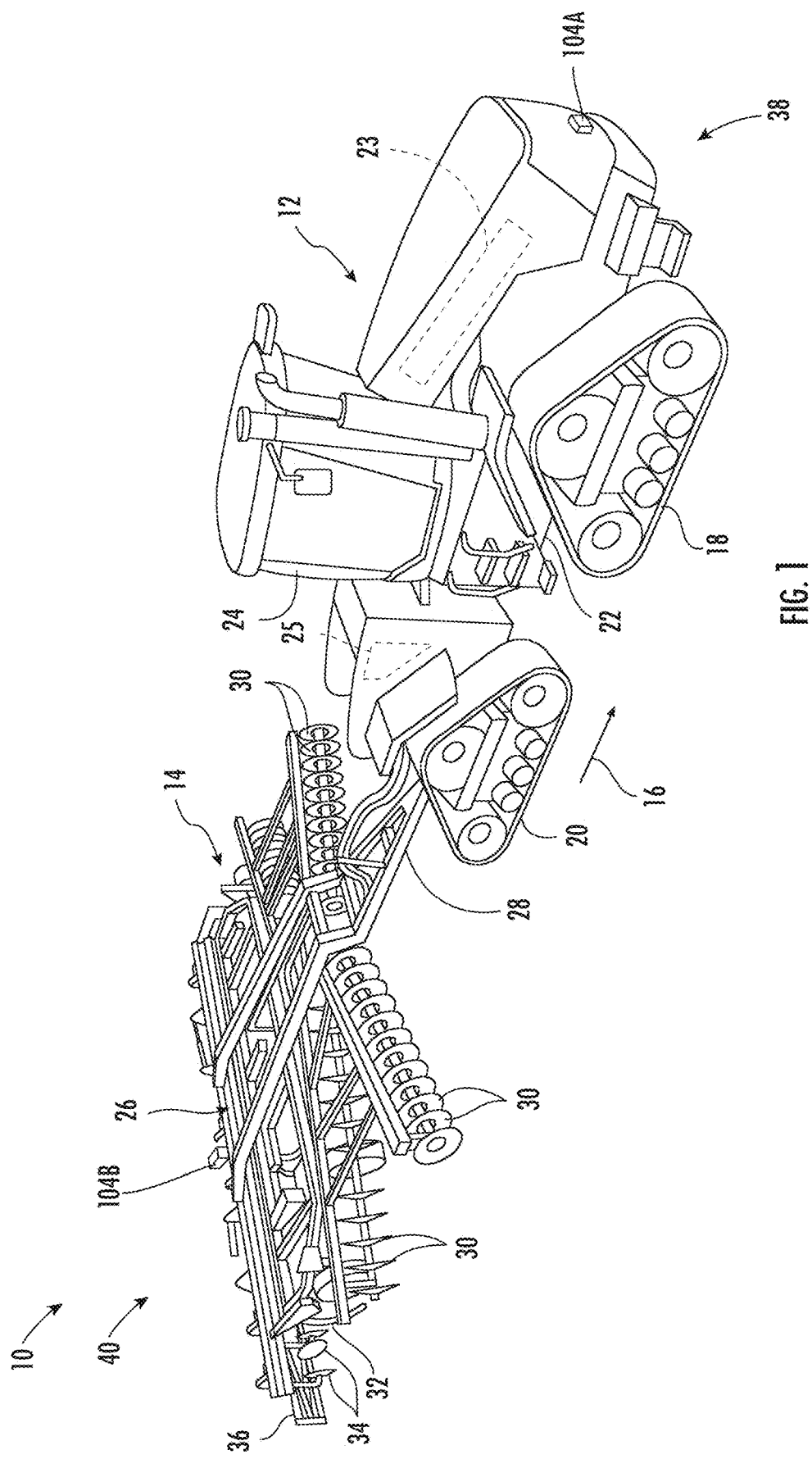
FIG. 1 illustrates a perspective view of one embodiment of an agricultural machine in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining the residue length within a field. The residue length, in turn, generally refers to any parameter associated with the length or size of the residue pieces present within the field. For example, the residue length may refer to an average length or a statistical distribution of the lengths of the residue pieces within a given portion of a field. As mentioned above, the length of the residue pieces present within the field generally affects the productivity potential of the soil. When the residue pieces are too long, the residue may be unevenly distributed across the field. In such instances, the field warm unevenly and portions of the soil may not be warm enough at the time of planting and/or experience slow seed germination. Conversely, when residue pieces are too small, soil erosion may occur.

In accordance with aspects of the present subject matter, the disclosed systems and methods utilize computer vision techniques and/or image processing algorithms to determine the lengths of the residue pieces within imaged portions of an agricultural field. In several embodiments, a computing system may receive a captured image depicting an imaged portion of a field from one or more imaging devices (e.g., a camera assembly). Furthermore, the computing system may determine an image gradient orientation at each of the captured image. Based at least in part on the determined image gradient orientations, the computing system may identify one or more residue pieces present within the imaged portion of the field. Thereafter, the computing system may determine the length or longest dimension of each identified residue piece.

Determining the residue length within the field based on the image gradients or texture depicted within captured images improves the accuracy the residue coverage determinations. As mentioned above, the accuracy of systems and methods that rely on color differences within captured images to determine residue length may suffer in certain ambient lighting conditions and when certain colors of soil and/or residue are present within the field. However, as described above, the disclosed systems and methods rely on image gradients to make residue coverage determinations. Specifically, the residue present within the field is typically characterized by a high number of gradients in the same orientation due to the straightness of the residue pieces, while gradients associated with soil are more randomly oriented. In this respect, based on the gradients within the captured images, individual residue pieces within the field can identified and their length can be then determined. Moreover, the ambient lighting conditions and the color of the soil and residue generally do not affect this texture-based analysis in same manner as they would for color-based analysis of the captured images. Thus, the systems and methods disclosed herein provide improved residue length determination accuracy, particularly as field conditions vary.

Referring now to drawings, FIG. 1 illustrates a perspective view of one embodiment of an agricultural machine 10 in accordance with aspects of the present subject matter. As shown, in the illustrated embodiment, the agricultural machine 10 includes a work vehicle 12 and an associated agricultural implement 14. In general, the work vehicle 12 is configured to tow the implement 14 across a field in a direction of travel (e.g., as indicated by arrow 16 in FIG. 1). In the illustrated embodiment, the work vehicle 12 is configured as an agricultural tractor and the implement 14 is configured as an associated tillage implement. However, in other embodiments, the work vehicle 12 may be configured as any other suitable type of vehicle, such as an agricultural harvester, a self-propelled sprayer, and/or the like. Similarly, the implement 14 may be configured as any other suitable type of implement, such as a planter. Furthermore, it should be appreciated that the agricultural machine 10 may correspond to any suitable powered and/or unpowered agricultural machine (including suitable vehicles and/or equipment, such as only a work vehicle or only an implement). Additionally, the agricultural machine 10 may include more than two associated vehicles, implements, and/or the like (e.g., a tractor, a planter, and an associated air cart).

As shown in FIG. 1, the work vehicle 12 includes a pair of front track assemblies 18, a pair or rear track assemblies 20, and a frame or chassis 22 coupled to and supported by the track assemblies 18, 20. An operator's cab 24 may be supported by a portion of the chassis 22 and may house various input devices for permitting an operator to control the operation of one or more components of the work vehicle 12 and/or one or more components of the implement 14. Additionally, as is generally understood, the work vehicle 12 may include an engine 23 and a transmission 25 mounted on the chassis 22. The transmission 25 may be operably coupled to the engine 23 and may provide variably adjusted gear ratios for transferring engine power to the track assemblies 18, 20 via a drive axle assembly (not shown) (or via axles if multiple drive axles are employed).

Additionally, as shown in FIG. 1, the implement 14 may generally include a carriage frame assembly 26 configured to be towed by the work vehicle 12 via a pull hitch or tow bar 28 in the direction of travel 16 of the vehicle 12. As is generally understood, the carriage frame assembly 26 may be configured to support a plurality of ground-engaging tools, such as a plurality of shanks, disk blades, leveling blades, basket assemblies, tines, spikes, and/or the like. For example, in the illustrated embodiment, the carriage frame assembly 26 is configured to support various gangs of disc blades 30, a plurality of ground engaging shanks 32, a plurality of leveling blades 34, and a plurality of crumbler wheels or basket assemblies 36. However, in alternative embodiments, the carriage frame assembly 26 may be configured to support any other suitable ground engaging tools and/or combination of ground engaging tools. In several embodiments, the various ground-engaging tools may be configured to perform a tillage operation or any other suitable ground-engaging operation across the field along which the implement 14 is being towed. In addition to being towed by the work vehicle 12, the implement 14 may also be a semi-mounted implement connected to the work vehicle 12 via a two-point hitch (not shown) or the implement 14 may be a fully mounted implement (e.g., mounted the work vehicle's 12 three-point hitch (not shown)).

It should be appreciated that the configuration of the agricultural machine 10 described above and shown in FIG. 1 is provided only to place the present subject matter in an exemplary field of use. Thus, it should be appreciated that the present subject matter may be readily adaptable to any manner of machine configuration, including any suitable work vehicle configuration and/or implement configuration. For example, in an alternative embodiment of the work vehicle 12, a separate frame or chassis may be provided to which the engine, transmission, and drive axle assembly are coupled, a configuration common in smaller tractors. Still other configurations may use an articulated chassis to steer the work vehicle 10 or rely on tires/wheels in lieu of the track assemblies 14, 16. Similarly, as indicated above, the carriage frame assembly 26 of the implement 12 may be configured to support any other suitable combination of type of ground-engaging tools.

Furthermore, in accordance with aspects of the present subject matter, the agricultural machine 10 may include one or more imaging devices 104 coupled thereto and/or supported thereon. As will be described below, each imaging device(s) 104 may be configured to capture images or other data relating to one or more conditions of the field along which the machine 10 is being traversed. Specifically, in several embodiments, the imaging device(s) 104 may be used to collect data associated with one or more surface conditions of the field, such as one or more conditions relating to crop residue, soil clods, and/or surface irregularities (e.g., ridges and/or valleys) within the field. For instance, as will be described below, the imaging device(s) 104 may be used to collect data associated with the determination of the lengths of residue pieces within the field.

In several embodiments, the imaging device(s) 104 may be provided in operative association with the agricultural machine 10 such that the imaging device(s) 104 has a field of view directed towards a portion(s) of the field adjacent to the work vehicle 12 and/or the implement 14, such as a portion(s) of the field disposed in front of, behind, and/or along one or both sides of the work vehicle 12 and/or the implement 14. For example, as shown in FIG. 1, in one embodiment, an imaging device(s) 104A may be provided at a forward end 38 of the work vehicle 12 to allow the imaging device(s) 104A to capture images and related data of a section of the field disposed in front of the work vehicle 12. Such a forward-located imaging device(s) 104A may allow pre-tillage images of the field to be captured for monitoring or determining surface conditions of the field prior to the performance of a tillage operation. Similarly, as shown in FIG. 1, a second imaging device(s) 104B may be provided at or adjacent to an aft end 40 of the implement 14 to allow the imaging device(s) 104B to capture images and related data of a section of the field disposed behind the implement 14. Such an aft-located imaging device(s) 104B may allow post-tillage images of the field to be captured for monitoring or determining surface conditions of the field after the performance of a tillage operation.

It should be appreciated that, in alternative embodiments, the imaging device(s) 104 may be installed at any other suitable location(s) on the work vehicle 12 and/or the implement 14. In addition, it should be appreciated that, in other embodiments, the agricultural machine 10 may only include a single imaging device(s) 104 mounted on either the work vehicle 12 or the implement 14 or may include more than two imaging device(s) 104 mounted on the work vehicle 12 and/or the implement 14. Moreover, it should be appreciated that each imaging device(s) 104 may be configured to be mounted or otherwise supported relative to a portion of the agricultural machine 10 using any suitable mounting/support structure. For instance, in one embodiment, each imaging device(s) 104 may be directly or indirectly mounted to a portion of the work vehicle 12 and/or the implement 14. Specifically, in one embodiment, suitable mounting structure (e.g., mounting arms, brackets, trays, etc.) may be used to support each imaging device(s) 104 out in front of the vehicle 12 or behind the implement 14 (e.g., in a cantilevered arrangement) to allow the imaging device(s) 104 to obtain the desired field of view, including the desired orientation of the device's field of view relative to the field (e.g., a straight-down view oriented generally perpendicular to the surface of the field).

In general, the imaging device(s) 104 may correspond to any suitable device(s) or other assembly configured to capture images of the field. For instance, in several embodiments, the imaging device(s) 104 may correspond to a stereo camera assembly having first and second cameras 106, 108 (FIG. 2) incorporated therein or otherwise forming a part thereof. In such embodiments, the stereo camera assembly may be used to capture both two-dimensional and three-dimensional images of the field. Specifically, each camera may include a lens and a separate image sensor for capturing two-dimensional images. Additionally, by simultaneously capturing an image of the same portion of the field with each camera, the separate images can be combined, compared, and/or otherwise processed to extract three-dimensional information about such portion of the field. For example, by comparing the images captured by each camera, a depth image) can be generated that allows the scene depth to be determined (e.g., relative to the camera) at each corresponding pixel location within the imaged portion of the field. As a result, the relative depth of specific features or points within the field may be determined. It should be appreciated that, in addition to a stereo camera assembly or as an alternative thereto, the agricultural machine 10 may include any other suitable type of imaging device(s) 104. For instance, suitable imaging device(s) 104 may also include single or non-stereo cameras, spectroscope cameras, multi-spectrum cameras, and/or the like.

Figure 2:
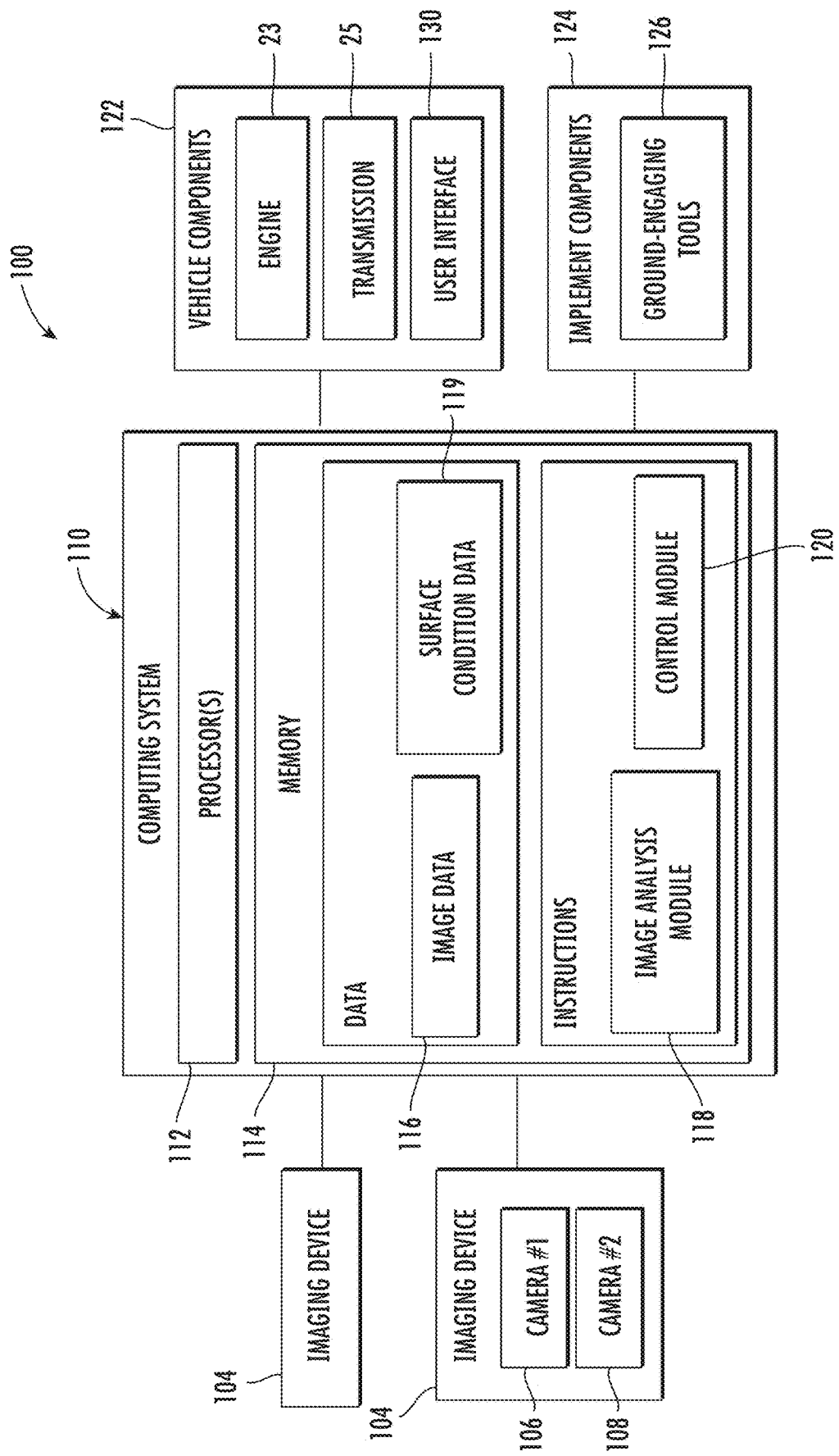
FIG. 2 illustrates a schematic view of one embodiment of a system for determining residue length within a field in accordance with aspects of the present subject matter.

Referring now to FIG. 2, a schematic view of one embodiment of a system 100 for monitoring one or more surface conditions associated with a field is illustrated in accordance with aspects of the present subject matter. In general, the system 100 will be described herein with reference to the agricultural machine 10 described above with reference to FIG. 1. However, it should be appreciated by those of ordinary skill in the art that the disclosed system 100 may generally be utilized with agricultural machines having any other suitable machine configuration.

As shown in FIG. 2, the system 100 may include one or more components of the agricultural machine 10 described above with reference to FIG. 1. For example, in several embodiments, the system 100 may include one or more of the imaging device(s) (e.g., imaging devices 104 shown in FIG. 1) configured to capture images of a portion(s) of the field disposed adjacent to the work vehicle 12 and or the implement 14. As indicated above, in one embodiment, one or more of the imaging device(s) 104 may correspond to a stereo camera assembly including first and second cameras 106, 108 for capturing both two-dimensional and three-dimensional images of the field. Additionally, the system 100 may include or be associated with one or more other components of the work vehicle 12 and/or the implement 14.

The system 100 may further include a computing system 110 communicatively coupled to the imaging device(s) 104. In several embodiments, the computing system 110 may be configured to receive and process the images captured by the imaging device(s) 104 to allow one or more surface conditions of the imaged portions of the field to be determined. For instance, as will be described below, the computing system 110 may be configured to execute one or more suitable image processing algorithms for determining the residue length within the field based on the captured images.

In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the image processing algorithm(s) and/or related method(s) described below. In addition, the computing system 110 may also include various other suitable components, such as a communications circuit or module, one or more input/output channels, a data/control bus and/or the like.

It should be appreciated that the computing system 110 may correspond to an existing controller of the work vehicle 12 or the implement 14 or the computing system 110 may correspond to a separate processing device. For instance, in one embodiment, the computing system 110 may form all or part of a separate plug-in module or computing device that is installed relative to the work vehicle 12 or implement 14 to allow for the disclosed system and method to be implemented without requiring additional software to be uploaded onto existing control devices of the work vehicle 12 or implement 14.

In several embodiments, the memory 114 of the computing system 110 may include one or more databases for storing information received and/or generated by the computing system 110. For instance, as shown in FIG. 2, the memory 114 may include an image database 116 storing data associated with the images captured by the imaging device(s) 104, including the images themselves and/or data deriving from the images (e.g., disparity maps or depth images generated based on the images captured by the imaging device(s) 104). Additionally, the memory 114 may include a surface condition database 119 storing data associated with the surface condition(s) being monitored by the computing system 110. For instance, as will be described below, the images and related data deriving from the imaging device(s) 104 may be used to determine the residue length within the field. In such instance, the residue length data generated by the computing system 110 may be stored within the surface condition database 119 for subsequent processing and/or analysis.

Moreover, as shown in FIG. 2, in several embodiments, the instructions stored within the memory 114 of the computing system 110 may be executed by the processor(s) 112 to implement an image analysis module 118. In general, the image analysis module 118 may be configured to process/analyze the images received from the imaging device(s) 104 and/or the data deriving therefrom to estimate or determine one or more surface conditions associated with the field. Specifically, in several embodiments, the image analysis module 118 may be configured to execute one or more image processing algorithms, such as the imaging processing algorithms described herein, to allow the residue length within the field to be estimated or determined by the computing system 110.

Referring still to FIG. 2, in one embodiment, the instructions stored within the memory 114 of the computing system 110 may also be executed by the processor(s) 112 to implement a control module 121. In general, the control module 121 may be configured to electronically control the operation of one or more components of the agricultural machine 10. For instance, in several embodiments, the control module 121 may be configured to control the operation of the agricultural machine 10 based on the monitored surface condition(s) of the field. Such control may include controlling the operation of one or more components 122 of the work vehicle 12, such as the engine 23 and/or the transmission 25 of the vehicle 12 to automatically adjust the ground speed of the agricultural machine 10. In addition (or as an alternative thereto), the control module 121 may be configured to electronically control the operation of one or more components 124 of the implement 14. For instance, the control module 121 may be configured to adjust the operating parameters (e.g., penetration depth, down force/pressure, etc.) associated with one or more of the ground-engaging tools 126 of the implement 14 (e.g., the disc blades 30, shanks 32, leveling blades 34, and/or basket assemblies 36) to adjust the operation of the implement proactively or reactively 14 in view of the monitored surface condition(s).

In several embodiments, the computing system 110 may also be communicatively coupled to a user interface, such as a user interface 130 housed within the cab 24 of the work vehicle 12 or at any other suitable location. The user interface 130 may be configured to provide feedback to the operator of the agricultural machine 10. Thus, the user interface 130 may include one or more feedback devices (not shown), such as display screens, speakers, warning lights, and/or the like, which are configured to communicate such feedback. In addition, some embodiments of the user interface 130 may include one or more input devices (not shown), such as touchscreens, keypads, touchpads, knobs, buttons, sliders, switches, mice, microphones, and/or the like, which are configured to receive user inputs from the operator.

It should be appreciated that, although the various control functions and/or actions will generally be described herein as being executed by the computing system 110, one or more of such control functions/actions (or portions thereof) may be executed by a separate computing system or may be distributed across two or more computing systems (including, for example, the computing system 110 and a separate computing system). For instance, in one embodiment, the computing system 110 may be configured to acquire data from the imaging device(s) 104 for subsequent processing and/or analysis by a separate computing system (e.g., a computing system associated with a remote server). In another embodiment, the computing system 110 may be configured to execute the image analysis module 118 to determine and/or monitor one or more surface conditions within the field, while a separate computing system (e.g., a vehicle computing system associated with the agricultural machine 10) may be configured to execute the control module 120 to control the operation of the agricultural machine 10 based on data and/or instructions transmitted from the computing system 110 that are associated with the monitored surface condition(s).

Figure 3:
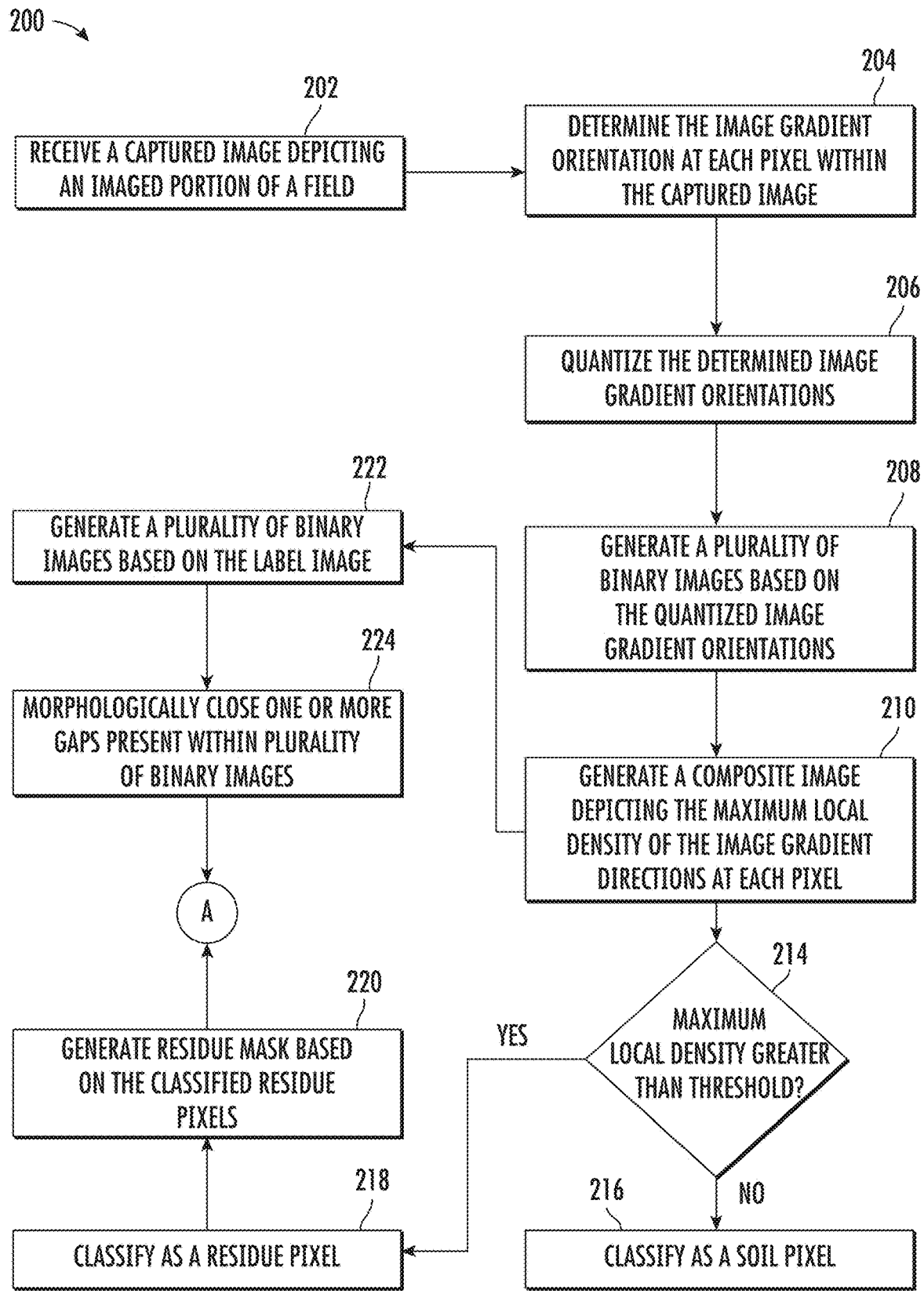
FIG. 3 illustrates a flow diagram providing a portion of one embodiment of example control logic for determining residue length within a field in accordance with aspects of the present subject matter.
Figure 4:
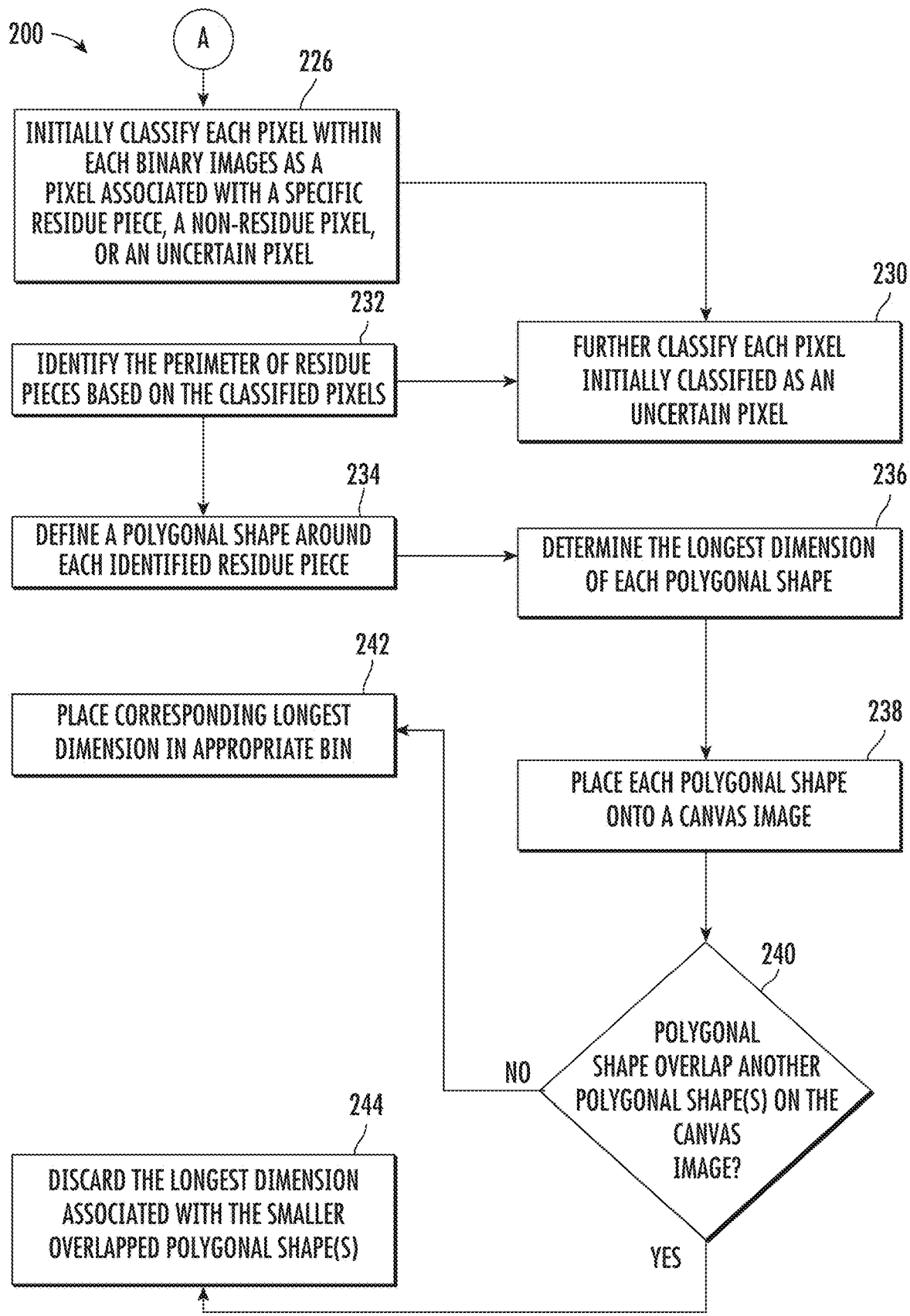
FIG. 4 illustrates a flow diagram providing another portion of the embodiment of example control logic for determining residue length within a field shown in FIG. 3.

Referring now to FIGS. 3 and 4, a flow diagram of one embodiment of example control logic 200 that may be executed by the computing system 110 (or any other suitable computing system) for determining residue length within imaged portions of a field is illustrated in accordance with aspects of the present subject matter. Specifically, the control logic 200 shown in FIGS. 3 and 4 is representative of steps of one embodiment of an image processing algorithm that can be executed to determine residue length within imaged portions of a field with substantial accuracy and without requiring substantial computing resources and/or processing time. Thus, in several embodiments, the control logic 200 may be advantageously utilized in association with a system installed on or forming part of an agricultural machine to allow for real-time determination of residue length within a field as the machine is traversed across the field during the performance of an agricultural operation. However, in other embodiments, the control logic 200 may be used in association with any other suitable system, application, and/or the like for detecting residue bunches within a field.

As shown in FIG. 3, at (202), the control logic 200 includes receiving a captured image of an imaged portion of the field. For example, as indicated above, the computing system 110 may be communicatively coupled to the imaging device(s) 104, thereby allowing images captured by the imaging device(s) 104 to be transmitted to and received by the computing system 110. In several embodiments, the image(s) received of each imaged portion of the field may correspond to a two-dimensional image(s). Alternatively, the image(s) received of each imaged portion of the field may correspond to a three-dimensional image(s). After receiving the captured image(s), the computing system 110 may be configured to preprocess the image(s). For example, in several embodiments, the computing system 110 may convert the received to image(s) in a gray-scale image(s). Such a conversion simplifies subsequent image processing by providing a single channel image(s) for the computing system 110 to analyze. In addition, in some embodiments, the computing system 110 may be configured to smooth the received image(s) to remove noise therefrom.

For the purposes of clarity, the below steps of the control logic 200 will be described in the context of processing a single captured image. These steps may be repeated on each subsequently captured image to make residue length determinations for the imaged portion of the field associated with each subsequent image.

At (204), the control logic 200 includes determining the image gradient orientation at each pixel within the captured image. More specifically, in several embodiments, the computing system 110 may be configured to analyze or process a captured image (e.g., the image received at (202)) to determine the image gradient at each pixel within the captured image. In such embodiments, the determined image gradient at each pixel includes two components: the magnitude of the gradient in the x-direction and the magnitude of the gradient in the y-direction. Thus, the computing system 110 may calculate the orientation or direction of the image gradient at each pixel based on the corresponding magnitudes of the gradients in the x- and y-directions.

As will be described below, the determined image gradient orientations may subsequently be used to determine or estimate the residue length within the image portion of the field. Specifically, the residue present within the field is typically characterized by a high number of gradients in the same orientation due to the straightness of the residue pieces. Conversely, the gradients of the soil are more randomly oriented. Thus, by identifying the gradient orientations within the images, the pixels within the captured image can be analyzed and classified as "residue pixels" or "non-residue pixels" (e.g., "soil pixels"). Based on the classified pixels within the captured image, the individual residue pieces within the imaged portion of the field residue can be identified. Thereafter, the lengths or longest dimension of each identified residue piece can be determined or estimated.

Furthermore, at (206), the control logic 200 includes quantizing the determined image gradient orientations at each of pixels. Specifically, in several embodiments, the computing system 110 may be configured to quantize each of the determined image gradient orientations within the captured image (e.g., the gradient orientations determined at (204)) as one of a predetermined plurality of image gradient orientations. That is, at (206), the computing system 110 may approximate each of the determined image gradient orientations as one of a fixed set of predetermined image gradient orientations to reduce the number of different image gradient orientations within the image. In this respect, reducing the number of gradient orientations may generally simplify the subsequent analysis of the image and reduce the computing resources needed for such analysis. For example, in one embodiment, the computing system 110 may quantize each of the determined image gradient orientations into one of nine gradient orientations. However, in alternative embodiments, the computing system 110 may quantize the determined image gradient orientations in any other suitable number of gradient orientations.

Additionally, at (208), the control logic 200 includes generating a plurality of binary images based on the quantized image gradient orientations. In general, each binary image may correspond to one of the quantized image gradient orientations (i.e., one of the predetermined plurality of image gradient orientations into which the determined gradient orientations are quantized). As such, each binary image depicts the pixels within the captured image having the corresponding image gradient orientation and the pixels within the image not having the corresponding image gradient orientation. Thus, the binary image depicts all of the pixels not having its image gradient orientation as the same. For example, FIG. 4 illustrates an example binary image 302 corresponding to a particular quantized image gradient orientation. The example binary image 302 illustrates regions of pixels having the corresponding quantized image gradient orientation (indicated by cross-hatched areas 304) and a region of pixels not having the corresponding quantized image gradient orientation (indicated by cross-hatched area 306).

Referring again to FIG. 3, in several embodiments, at (208), the computing system 110 may be configured to generate a binary image corresponding to each quantized image orientation based on the quantized image gradients associated with the captured image. For example, as mentioned above, in one embodiment, the computing system 110 may quantize the determined image gradient orientations into one of nine predetermined gradient orientations. In such an embodiment, the computing system 110 may generate nine binary images, with each generated binary image depicting the pixels (or groups of pixels) having the corresponding quantized gradient orientation and the pixels within the image not having the corresponding image gradient orientation. Alternatively, the computing system 110 may generate any other suitable number of binary images. In several embodiments, (206) and (208) of the control logic 200 may be performed simultaneously as a single step.

At (210), the control logic 200 includes generating a composite image depicting the local maximum density of the image gradient orientations at each pixel within the captured image. Specifically, in several embodiments, the computing system 110 may be configured to the determine the density of the image gradient orientations for a plurality of pixels within each of the generated binary images. The density of the image gradient orientations for a given pixel is, in turn, the spatial average of the image gradient orientations depicted within the corresponding binary image (e.g., the spatial average of the gradient orientation associated with the binary image, which may be indicated as a "1," and the gradient orientations not associated with the binary image, which may be indicated as a "0") of the given pixel and several of its neighboring pixels. Thus, the image gradient density generally provides an indication of how strongly the gradient orientations in region surrounding the given pixel correspond to a particular quantized image gradient orientation.

In several embodiments, at (210), the computing system 110 may be configured to analyze each binary image to determine the image gradient orientation densities of each pixel therein. More specifically, the computing system 110 may blur and subsequently downsample each binary image to determine the image gradient orientation densities at each pixel. By blurring and downsampling each binary image, a corresponding gradient orientation density image is created from each binary image. In general, to blur the binary images, the computing system 110 may perform a 2D convolution of on each binary image with a kernel. The kernel is, in turn, a 2D array of pixels that is typically much smaller than the binary image (e.g., five-by-five group of pixels). The size of the kernel and the value of the pixels within the kernel generally define the size of the group or neighborhood over which each pixel is blurred. Thus, the value of each blurred pixel is determined by a group of other nearby pixels and each pixel ends up being used in many such groups. For example, the computing system 110 may filter each binary image with a two-dimensional Gaussian kernel to create the corresponding blurred image. Thus, after blurring and downsampling, each binary image depicts the image gradient density at each region within the image.

Moreover, at (210), the computing system 110 may generate the composite image based on the plurality of blurred and downsampled images (i.e., the density images). Specifically, as mentioned above, the composite image depicts the local maximum density of the image gradient orientations at each pixel within the captured image. In this respect, the computing system 110 may analyze each of the plurality of blurred and downsampled images to determine the local maximum density of the image gradient orientations at each pixel across the plurality of blurred and downsampled images. The determined local maximum density, in turn, indicates which of the quantized gradient orientations that is most prevalent within the immediate area of each pixel. Thereafter, the computing system 110 may generate the composite image based on the determined local maximum densities of the image gradient orientations. The generated composite image may also depict the quantized image gradient orientation at which the maximum local density occurs at each pixel within the composite image.

At (214), the control logic 200 includes determining whether the determined maximum local density of each pixel within the image exceeds a threshold density value. Specifically, in several embodiments, the computing system 110 may be configured to compare the determined maximum local density associated with each pixel within the composite image to a threshold density value. When the maximum local density associated with a given pixel is less than or equal to the threshold density value, the computing system 110 may be configured to classify (e.g., at 216) such pixel as a "non-residue pixel," such as a "soil pixel." However, when the maximum local density associated with a given pixel is greater than the threshold density value, the computing system 110 may be configured to classify (e.g., at 218) such pixel as a "residue pixel." Thus, the computing system 110 may be configured to analyze the pixels contained within the composite image in view of the threshold density value and classify each pixel as either a "non-residue residue pixel" or a "residue pixel."

The threshold density value may generally correspond to a fixed value or may be selected or determined based on the current residue conditions within the field. For instance, in one embodiment, the threshold density value may correspond to an operator-selected value based on observed conditions or be calculated based on sensed surface conditions associated with the residue within the field.

Figure 5:
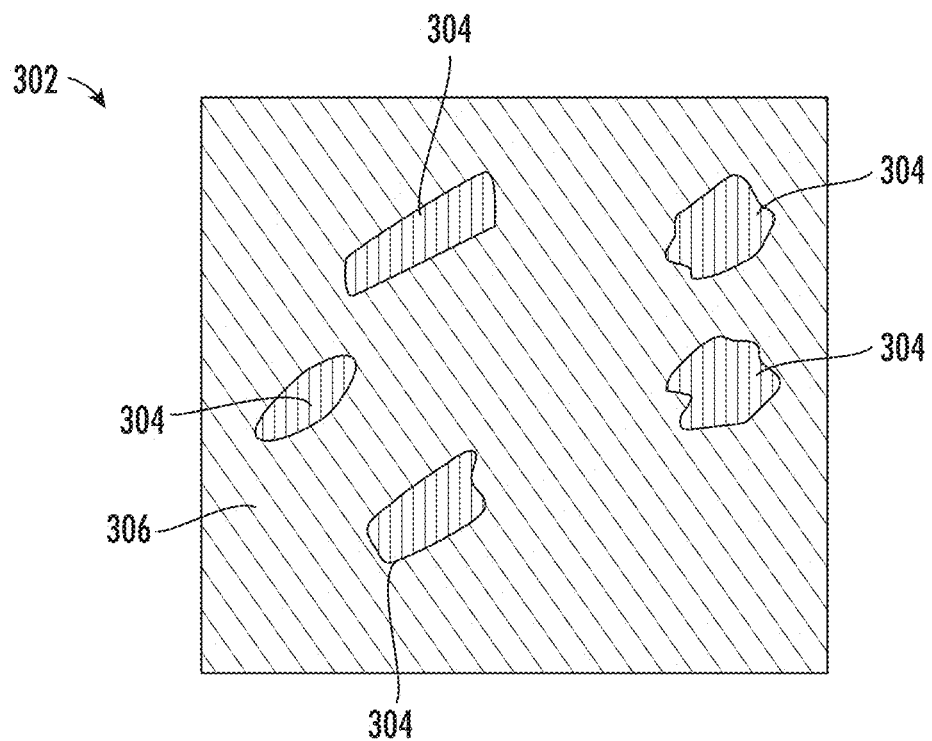
FIG. 5 illustrates an example binary image that identifies the pixels within a captured image of the field having a particular quantized image gradient orientation in accordance with aspects of the present subject matter.
Figure 6:
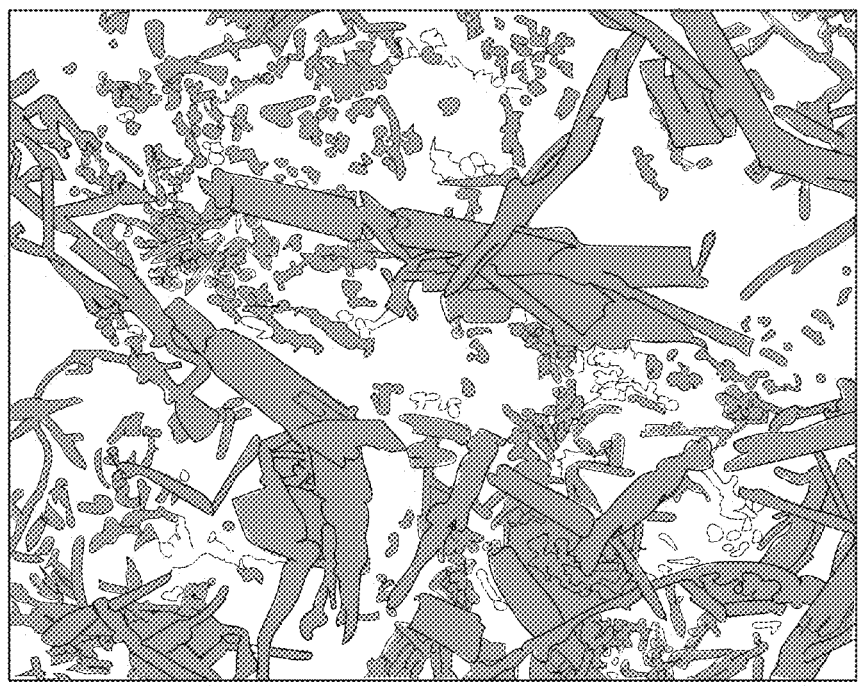
FIG. 6 illustrates an example residue mask that identifies "residue pixels" (as opposed to "non-residue pixels") within an image of a field in accordance with aspects of the present subject matter.

Furthermore, at (220), the control logic 200 includes generating a residue mask associated with the imaged portion of the field. Specifically, the computing system 110 may be configured to generate the residue mask based on the classified pixels in the composite image. Thus, the residue mask may generally depict the locations of pixels classified as residue within the composite image (e.g., as classified at (218)). In some embodiments, the computing system 110 may perform morphological opening and/or closing operations to fill out the residue portions of the composite image (e.g., to connect nearby groups residue pixels that are separated from each other, but likely form the same piece of residue) as part of generating the residue mask. For instance, FIG. 5 illustrates an example residue mask 308 associated with an imaged portion of a field in which the "residue pixels" are shaded to indicate the crop residue within the field, with the remainder of the pixels (i.e., the "non-residue pixels") that are not shaded being indicative of soil or other non-residue materials/objects within the field. As will be described below, the residue mask may, in addition to the composite image, be used to identify pieces of residue present within the imaged portion of the field.

Figure 7:
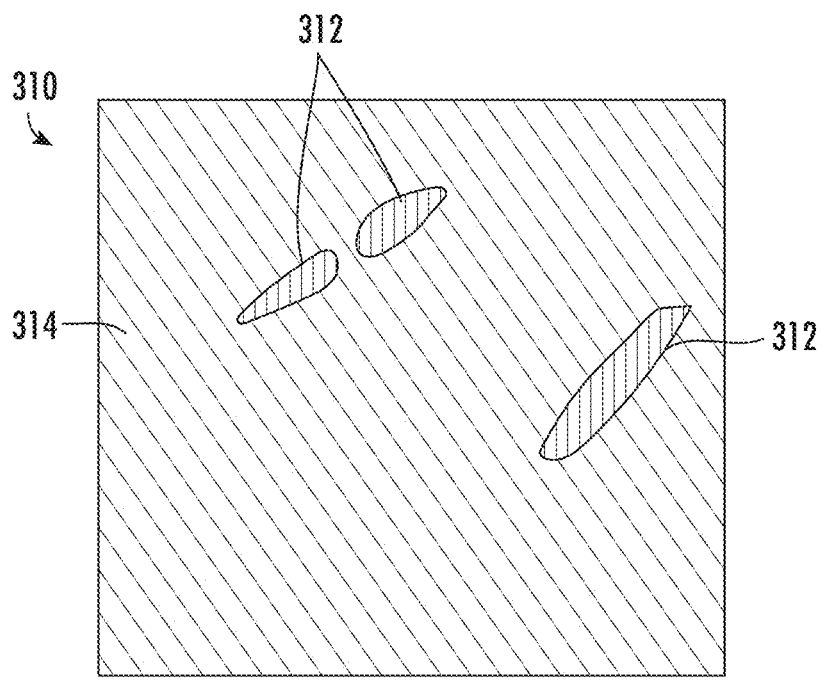
FIG. 7 illustrates an example binary image that identifies pixels at which the maximum local density of the image gradient orientations occurs within a corresponding predetermined image gradient orientation range in accordance with aspects of the present subject matter.

Moreover, at (222), the control logic 200 includes generating a plurality of binary images based on the composite image. In general, each binary image may correspond to one the quantized image gradient orientations (i.e., one of the predetermined plurality of image gradient orientations into which the determined gradient orientations are quantized). As such, each binary image depicts the pixels within the composite image having their maximum local density at the corresponding image gradient orientation (e.g., as a "1") and the pixels within the composite image not having their maximum local density at the corresponding image gradient orientation (e.g., as a "0"). Thus, the binary image depicts all of the pixels not having their maximum local density at the corresponding image gradient orientation as the same. For example, FIG. 7 illustrates an example binary image 310 corresponding to a particular quantized image gradient orientation. The example binary image 310 illustrates regions of pixels having their maximum local density at the corresponding quantized image gradient orientation (indicated by cross-hatched areas 312) and a region of pixels not having their maximum local density at the corresponding quantized image gradient orientation (indicated by cross-hatched area 314).

Referring again to FIG. 3, in several embodiments, at (222), the computing system 110 may be configured to generate a binary image corresponding to each quantized image orientation. For example, as mentioned above, in one embodiment, the computing system 110 may quantize the determined image gradient orientations into one of nine predetermined gradient orientations. In such an embodiment, the computing system 110 may generate nine binary images, with each generated binary image depicting the pixels (or groups of pixels) having their maximum local image gradient density at the corresponding quantized gradient orientation (e.g., as a "1") and the pixels within the image not having the corresponding image gradient orientation (e.g., as a "0"). Alternatively, the computing system 110 may generate any other suitable number of binary images.

Additionally, in several embodiments, there may be some overlap between the image gradient orientations associated with the binary images generated at (222). Specifically, as described above, a range of image gradient orientations (e.g., a twenty-degree range) may be quantized or approximated as a single quantized image gradient orientation (e.g., at (206)). However, residue pieces having their maximum local image gradient densities near the transition between two of these ranges may be missed. As such, in some embodiments, the image gradient orientation range associated with each binary image generated at (222) may overlap with the adjacent image gradient orientation ranges. Thus, the image gradient orientation range associated with the quantized image gradient orientation of a first binary image may overlap with the image gradient orientation associated with the quantized image gradient orientation of a second binary image. For example, in one instance, all of the image gradient orientations between zero and twenty degrees may be quantized as a first orientation, all of the image gradient orientations between twenty and forty degrees may be quantized as a second orientation, all of the image gradient orientations between forty and sixty degrees may be quantized as a third orientation, and so on. In such an instance, the binary image generated at (222) corresponding to the second orientation may depict the pixels having their maximum local image gradient densities between zero and sixty degrees (i.e., the second quantized orientation and the adjacent first and third quantized orientations) as a "1" and all of the pixels having their maximum local density at any other orientation as a "0". This overlap help prevent residue pieces having their maximum local image gradient densities near the transition between two of these ranges may not be easily identified. However, in alternative embodiments, there may be no overlap of the binary images generated at (222).

Figure 8:
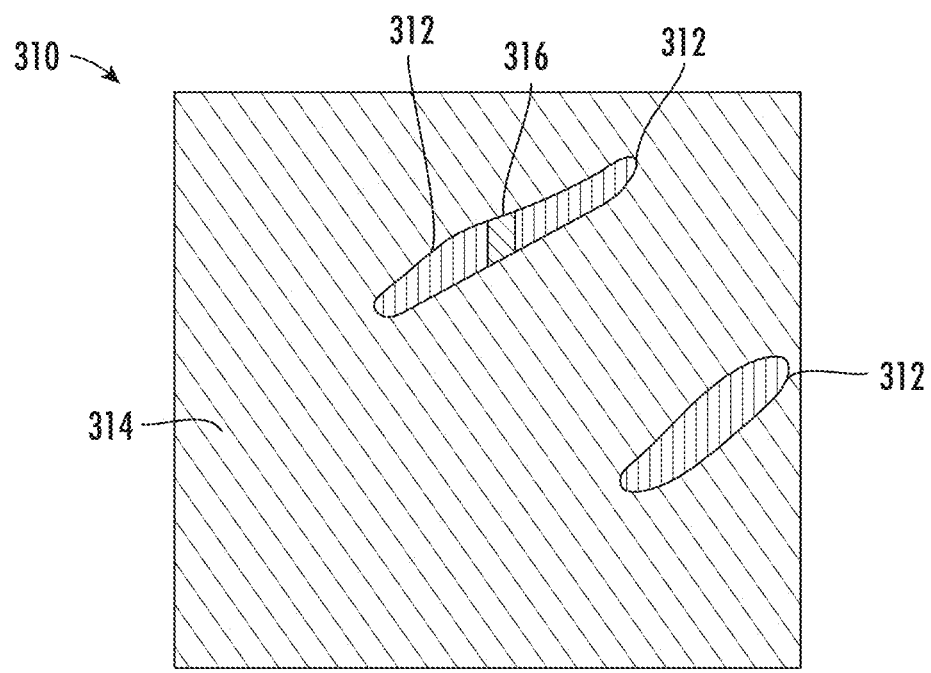
FIG. 8 illustrates the example binary image shown in FIG. 7 after a morphological closing operation has been performed in accordance with aspects of the present subject matter.

Furthermore, at (224), the control logic 200 includes morphologically close one or more gaps present within the plurality of binary images. Each of the binary images generated at (222) may illustrate regions of pixels having their maximum local image gradient orientation densities at a similar range of orientations. Such regions of pixels may form residue pieces or portions of the residue pieces. However, in the imaged portion of the field, one piece of residue may lay across another piece of residue at a different orientation. In such instances, the regions of pixels corresponding to these pieces of residue have their maximum local image gradient orientation densities at different orientations. Thus, in the binary image depicting the bottom piece of residue, there may two isolated regions of pixels having their maximum local image gradient orientation densities at the corresponding orientation, with a gap therebetween. This gap may be caused by the pixels having their maximum local image gradient orientation densities at the orientation corresponding to the top piece of residue. In this respect, the computing system 110 may perform a morphological closing operation(s) on each binary image to connect nearby groups pixels (e.g., pixels indicated as a "1") that are separated from each other, but likely form the same piece of residue (such as because another piece of residue is laying on top of it). Specifically, the computing system 110 may perform a directional closing operation in the direction perpendicular to the dominant gradient orientation associated with the corresponding binary image. The dominant gradient orientation, in turn, points across the narrow width of the residue piece such that the directional closing is aligned with the length or longest dimension of the residue piece. For example, FIG. 8 illustrates the example binary image 310 shown in FIG. 7, with the gap between two nearby pixel groups filled in or otherwise closed (indicated by cross-hatched region 316).

Figure 9:
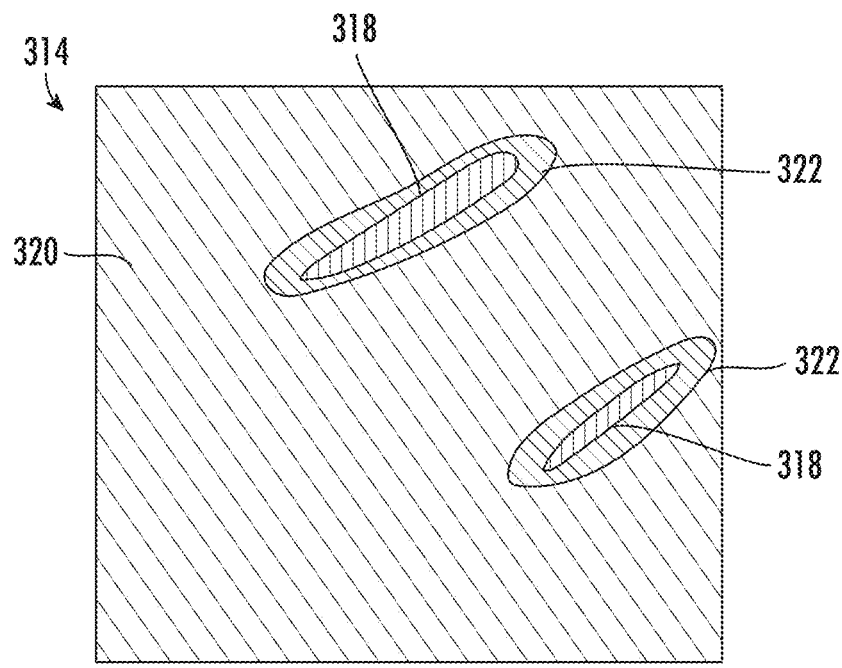
FIG. 9 illustrates the example binary image shown in FIGS. 7 and 8 after each pixel therein has been initially classified as a "residue pixel," a "non-residue pixel," or an "uncertain pixel" in accordance with aspects of the present subject matter.

Referring again to FIG. 4, at (226), the control logic 200 includes initially classifying each pixel within each binary image as one of a residue pixel associated with a specific residue piece, a non-residue pixel, or an uncertain pixel. In several embodiments, the computing system 110 may classify each pixel within each binary image as one of a residue pixel associated with a specific residue piece (e.g., residue piece one, residue piece two, etc.), a non-residue pixel, or an uncertain pixel based on the distance between each pixel and the edge of one the one or more residue regions depicted within the residue mask image (e.g., the residue mask image generated at (220)). Specifically, the computing system 110 may determine the distance between each pixel within each binary image and a residue region depicted within the residue mask. Thereafter, the computing system 110 may compare each determined distance to one or more threshold values to classify the corresponding pixel. In one embodiment, when a given distance is less than a first threshold value, the computing system 110 may classify the given pixel as a residue pixel associated with a specific residue piece. In such an embodiment, when the given distance is greater than a second threshold value (with the second threshold value being larger than the first threshold value), the computing system 110 may classify the given pixel as a non-residue pixel. Moreover, in such an embodiment, when a given distance is between the first and second threshold values, the computing system 110 may classify the given pixel as an uncertain pixel. For example, FIG. 9 illustrates the example binary image 310 shown in FIGS. 7 and 8 after the pixels therein have been classified. As shown, the pixels classified as a residue pixel associated with a specific residue piece are indicated by cross-hatched regions 318, the pixels classified as non-residue pixels are indicated by cross-hatched region 320, and the pixels classified as uncertain pixels are indicated by cross-hatched regions 322. Alternatively, each pixel may be classified as a residue pixel associated with a specific residue piece, a non-residue pixel, or an uncertain pixel in any other suitable manner. For example, in one embodiment, only one threshold value may be used.

Moreover, at (230), the control logic 200 includes further classifying each pixel initially classified as an uncertain pixel. In several embodiments, the computing system 110 may classify pixel initially classified as an uncertain pixel based the proximity of each uncertain pixel to one or more pixels initially classified as a residue pixel(s) being associated with a specific residue piece and one or more pixels initially classified as a non-residue pixel(s). For example, in some embodiments, the computing system 110 may use the Watershed technique to classify the uncertain pixels based proximity to the residue pixel(s) associated with a specific residue piece(s) and the non-residue pixel(s).

Furthermore, at (232), the control logic 200 includes identifying the perimeter of the residue pieces based on the classified pixels. Specifically, in several embodiments, the computing system 110 may identify the perimeter of each residue piece present within the imaged portion of the field based on the classified pixels in each of the binary images (e.g., the pixels classified at (226) and (230)). For example, in some embodiments, the computing system 110 may use any suitable perimeter-defining technique to identify the perimeters of the residue pieces.

Figure 10:
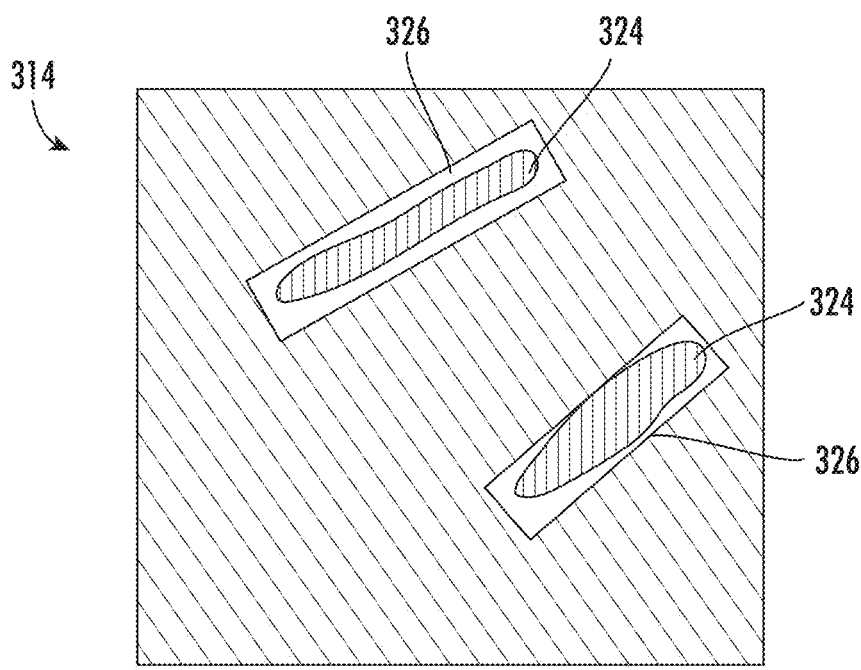
FIG. 10 illustrates the example binary image shown in FIGS. 7-9 after a polygonal shape has been defined around each residue piece in accordance with aspects of the present subject matter.

In addition, at (234), the control logic 200 includes defining a polygonal shape around each identified residue piece. Specifically, in several embodiments, the computing system 110 may define a polygonal shape around each identified residue piece within each binary image. In some embodiments, the defined polygonal shapes may be rectangles. In such embodiments, each polygonal shape may, in turn, have the same length or longest dimension as the length or longest dimension of the corresponding residue piece. Thus, the length of the polygonal shape may be indicative of the length of the corresponding residue piece. For example, FIG. 10 illustrates the example binary image 310 shown in FIGS. 7-9 after rectangles 326 have been defined around identified residue pieces 324. However, in alternative embodiments, the defined polygonal shapes may correspond to any other suitable polygonal shapes.

Referring again to FIG. 4, at (236), the control logic 200 includes determining the longest dimension of each polygonal shape. For example, in several embodiments, the computing system 110 may determine the longest dimension of each polygonal shape defined around an identified piece of residue within each binary image. When the polygonal shape does not have a readily identifiable longest dimension, at (236), the computing system 110 may determine the characteristic length of the polygonal shape. The characteristic length, in turn, may be the dimension of the polygonal shape that is most representative of the length or longest dimension of residue piece around which the polygonal shape is defined.

At (238), the control logic 200 includes placing each defined polygonal shape on a canvas image. More specifically, the polygonal shapes (e.g., the polygonal shapes defined at (234)) may overlap with other polygonal shapes. In such instances, the overlapping polygonal shapes generally correspond to the same piece of residue. Thus, to prevent the length of only a portion of a residue piece from being determined, the computing system 110 may place each defined polygonal shape onto a canvas image. The canvas image may, in turn, correspond to the imaged portion of the field currently being analyzed. In this respect, the canvas image may start off as a binary image of all zeros. Each defined polygonal shape is placed onto the canvas image with the same orientation as it was depicted in the corresponding binary image. Specifically, when a given polygonal shape is placed onto the canvas image, the pixels on the canvas image within the perimeter of the given polygonal shape are changed to ones. As will be described below, the canvas image may be used to identify duplicated polygonal shapes (e.g., polygonal shapes corresponding to the same piece of residue), thereby allowing the computing system 110 to discard these shapes and their corresponding longest dimension determinations.

In some embodiments, the computing system 110 may place only a predetermined number defined polygonal shapes onto the canvas image to reduce the time necessary to execute the control logic 200 and conserve computing resources. For example, in one embodiment, the computing system 110 may place the one hundred polygonal shapes having the longest length (e.g., as determined at (236)) onto the canvas image. Typically, polygonal shapes not falling into this category typically correspond to only a small portion of a residue piece or pixels that do not correspond to a residue piece at all. In this respect, the computing system 110 may discard the remaining polygonal shapes and their corresponding length determinations.

Furthermore, at (240), the control logic 200 includes determining whether polygonal shape placed on the canvas image overlap with any other polygonal shape already placed on the canvas image. Specifically, in several embodiments, as each polygonal shape is placed onto the canvas image, the computing system 110 may determine whether that polygonal shape overlaps with any polygonal shape already placed on the canvas image. In one embodiment, the predetermined number of polygonal shapes are placed onto the canvas image from longest to shortest. Specifically, the computing system 110 may determine the fraction of the pixels on the canvas image that have already been sent to ones. When the fraction of overlapping pixels is below a threshold (thereby indicating that the polygonal shape corresponds to a residue piece that has not previously been detected), the computing system 110 may be configured to place (e.g., at 242) the corresponding longest dimension in an appropriate bin. However, when the fraction of the overlapping pixels exceeds the threshold (thereby indicating that the smaller overlapped polygonal shape corresponds to only a portion of a residue piece), the computing system 110 may be configured to discard (e.g., at 244) the smaller overlapped polygonal shape and its corresponding longest dimension. Thus, the discarded polygonal shape is not placed on the canvas image. As such, the longest dimensions of the polygonal shapes placed in the bin(s), in turn, correspond to the lengths of the residue pieces present within the imaged portion of the field.

Figure 11:
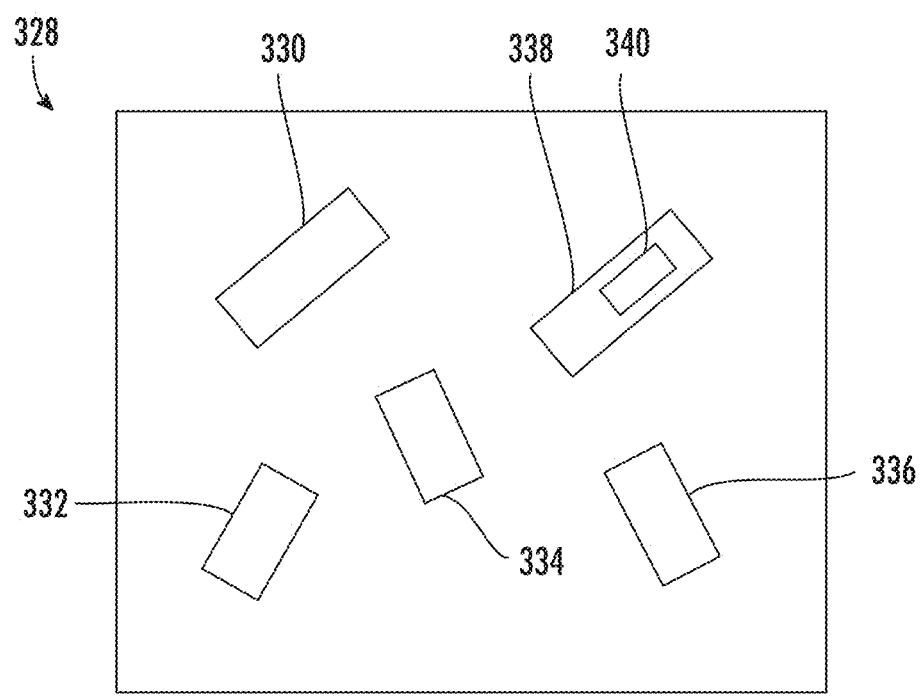
FIG. 11 illustrates an example canvas image on which several polygonal shapes associated with residue pieces have been placed in accordance with aspects of the present subject matter.

For example, FIG. 11 illustrates an example canvas image 328. In the example canvas image 328, several polygonal shapes 330, 332, 334, 336, 338, 340 have been placed on the canvas image 328. As shown, the polygonal shape 340 overlaps the polygonal shape 338. In this respect, the polygonal shapes 338 and 340 both correspond to the same piece of residue within the imaged portion of the field. Since the polygonal shape 338 is longer than the polygonal shape

340, the longest dimension of the polygonal shape 338 is placed in the appropriate bin and the longest dimension of the polygonal shape 340 is discarded.

The longest dimensions of the polygonal shapes may be placed in any suitable number of bins. For example, in one embodiment, the longest dimensions may be placed into a single bin from which the average residue piece length can be determined. In another embodiment, the longest dimensions may be placed into one of several bins, with each bin corresponding to a range of residue piece length. In such an embodiment, the computing system 110 may perform any suitable statistical analysis of the residue piece lengths, such as providing the number or percentage of residue pieces present within the field falling into each of several length ranges.

It should be appreciated that, upon determination of the residue piece lengths, the computing system 110 may be configured to perform any number of follow-up actions, including storing data associated with the determined residue piece lengths within its memory 114 and/or transmitting such data to a separate computing device (e.g., a remote server and/or a computing device associated with a corresponding agricultural machine, such as a vehicle controller). Such actions may also include generating a notification for display to an operator (e.g., via the associated user interface 130) that provides information associated with the determined residue piece lengths.

Additionally, as indicated above, the computing system 110 (or a separate computing system) may be configured to control the operation of an associated agricultural machine based on the residue piece lengths. For instance, when the imaging device(s) 104 are installed on an agricultural machine, the present subject matter may allow for real-time detection of residue piece lengths within a field as the machine traverses the field during the performance of an agricultural operation. In such an embodiment, adjustments of the operation of the agricultural machine may be made in real-time in response to the residue piece length determinations. For example, when the agricultural machine includes a tillage implement configured to perform tillage operation within the field (e.g., the implement 14 shown in FIG. 1), real-time adjustments may be made to the tillage parameters associated with the ground-engaging tools of the implement, such as by adjusting the penetration depth, down pressure/force, angle-of-attack, and/or the like of one or more of the ground-engaging tools.

Moreover, in embodiments in which the disclosed system is configured to capture both pre-tilled and post-tilled images of the field, the computing system 110 may be configured to compare and contrast the pre-tilled and post-tilled images to assess the effectiveness of a tillage implement in providing the desired residue length. For instance, when the initial residue coverage and/or residue evenness is determined based on a pre-tilled image of a given imaged portion of the field, a corresponding post-tilled image of such portion of the field may also be captured to determine whether the tillage operation has resulted in the desired change to the initial residue length.

Figure 12:
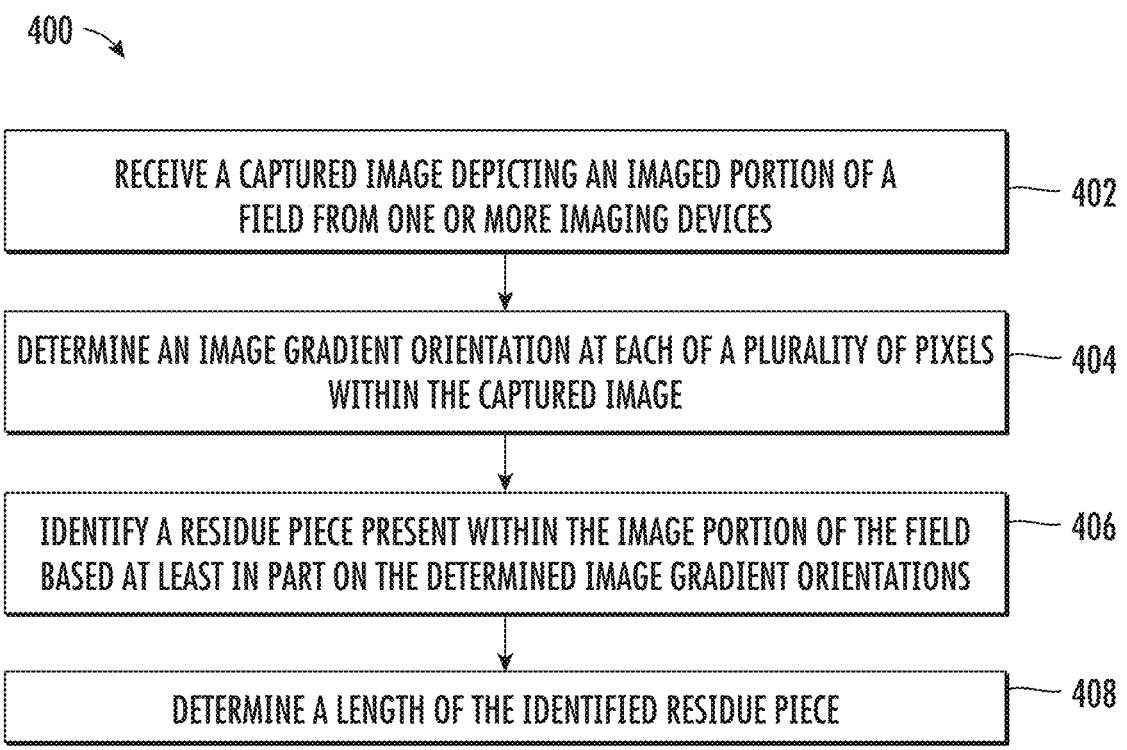
FIG. 12 illustrates a flow diagram of one embodiment of a method for determining residue length within a field in accordance with aspects of the present subject matter.

Referring now to FIG. 12, a flow diagram of one embodiment of a method 400 for determining residue coverage of a field is illustrated in accordance with aspects of the present subject matter. In general, the method 400 will be described herein with reference to the agricultural machine 10 shown in FIG. 1 and the various system components shown in FIG. 2. However, it should be appreciated that the disclosed method 400 may be implemented with agricultural machines having any other suitable machine configurations and/or within systems having any other suitable system configuration. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 12, at (402), the method 400 may include receiving, with a computing system, a captured image depicting an imaged portion of a field from one or more imaging devices. For example, as described above, the computing system 110 may be communicatively coupled to the imaging device(s) 104, thereby allowing images captured by the imaging device(s) to be transmitted to and received by the computing system 110.

Additionally, at (404), the method 400 may include determining, with the computing system, an image gradient orientation at each of a plurality of pixels within the captured image. For example, as described above, the computing system 110 may analyze or process the captured image to determine the image gradient orientation at each of a plurality of pixels within the captured image.

Moreover, at (406), the method 400 may include identifying, with the computing system, a residue piece present within the image portion of the field based at least in part on the determined image gradient orientations. For example, as described above, the computing system 110 may identify one or more individual residue pieces present within the image portion of the field based at least in part on the determined image gradient orientations.

Referring still to FIG. 12, at (408), the method 400 may include determining, with the computing system, the length of the identified residue piece. For example, as described above, the computing system 110 may determine the length(s) of the identified residue piece(s). Thereafter, the computing system 110 may determine the average of the residue piece length(s) present within the imaged portion of the imaged or a statistical distribution of such length(s).

It is to be understood that the steps of the control logic 200 and method 400 are performed by a computing system (e.g., computing system 110) upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as the control logic 200 and method 400, is implemented in software code or instructions which are tangibly stored on a tangible computer readable medium. The computing system loads the software code or instructions via a direct interface with the computer readable medium or via a wired and/or wireless network. Upon loading and executing such software code or instructions by the computing system, the computing system may perform any of the functionality of the computing system described herein, including any steps of the control logic 200 and method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A method for determining residue length within a field, the method comprising:
    receiving, with a computing system, a captured image depicting an imaged portion of the field from one or more imaging devices;
    determining, with the computing system, an image gradient orientation at each of a plurality of pixels within the captured image;
    identifying, with the computing system, a residue piece present within the image portion of the field based at least in part on the determined image gradient orientations, wherein identifying the residue piece comprises:
        generating, with the computing system, a composite image depicting the image gradient orientation at which a maximum local density of the image gradient orientations occurs for the plurality of pixels; and
        generating, with the computing system, a plurality of binary images based on the composite image, each binary image corresponding to one of a plurality of predetermined image gradient orientations such that each binary image depicts one or more pixels of the plurality of pixels at which the maximum local density of the image gradient orientations occurs at the corresponding predetermined image gradient orientation; and
    determining, with the computing system, a length of the identified residue piece.

2. The method of claim 1, wherein identifying the residue piece comprises:
    generating, with the computing system, a mask image depicting one or more residue regions within the imaged portion of the field.

3. The method of claim 1, wherein the predetermined image gradient orientation associated with a first binary image of the plurality of binary images overlaps with the predetermined image gradient orientation associated with a second binary image of the plurality of binary images.

4. The method of claim 1, wherein identifying the residue piece further comprises:
    morphologically closing, with the computing system, one or more gaps present within each of the plurality of binary images in a direction perpendicular to a dominant orientation depicted within the plurality of binary images.

5. The method of claim 4, wherein identifying the residue piece further comprises:
    initially classifying, with the computing system, each pixel of the plurality of pixels within each of the plurality of binary images as one of a residue pixel associated with a specific residue piece, a non-residue pixel, or an uncertain pixel based on a distance between each pixel and an edge of one the one or more residue regions depicted within the mask image.

6. The method of claim 5, wherein identifying the residue piece further comprises:
    further classifying, with the computing system, each pixel initially classified as an uncertain pixel based a proximity of each uncertain pixel to one or more pixels of the plurality of pixels initially classified as a residue pixel and one or more pixels of the plurality of pixels initially classified as a non-residue pixel.

7. The method of claim 6, wherein identifying the residue piece further comprises:
    identifying, with the computing system, a perimeter of one or more residue pieces based on the classified pixels.

8. The method of claim 1, wherein determining the length of the identified residue piece comprises:
    defining, with the computing system, a polygonal shape around each identified residue piece within each of the plurality of binary images; and
    determining, with the computing system, a longest dimension of each polygonal shape.

9. The method of claim 8, further comprising:
    placing, with the computing system, each polygonal shape onto a canvas image.

10. The method of claim 9, further comprising:
    when a fraction of overlapping pixels associated two of the polygonal shapes depicted on the canvas image exceeds a threshold, discarding, with the computing system, the determined longest dimension associated with a smaller of the two polygonal shapes.

11. The method of claim 1, wherein the one or more imaging devices are supported relative to an agricultural machine such that the images of the field are captured as the agricultural machine travels across the field, the method further comprising:
    initiating, with the computing system, a control action associated with adjusting an operation of the agricultural machine based on the determined length as the agricultural machine travels across the field.

12. A system for determining residue length within a field, the system comprising:
    an imaging device configured to capture images of a field; and
    a computing system communicatively coupled to the imaging device, the computing system including a processor and associated memory, the memory storing instructions that, when implemented by the processor, configure the computing system to:
    receive a captured image depicting an imaged portion of the field from one or more imaging devices;
    determine an image gradient orientation at each of a plurality of pixels within the captured image;
    identify a residue piece present within the image portion of the field at least in part based on the determined image gradient orientations, wherein, when identifying the residue piece, the computing system is configured to:

generate a composite image depicting the image gradient orientation at which a maximum local density of the image gradient orientations occurs for the plurality of pixels; and generate a plurality of binary images based on the composite image, each binary image corresponding to one of a plurality of predetermined image gradient orientations such that each binary image depicts one or more pixels of the plurality of pixels at which the maximum local density of the image gradient orientations occurs at the corresponding predetermined image gradient orientation; and determine a length of the identified residue piece.

13. The system of claim 12, wherein, when identifying the residue piece, the computing system is further configured to:
generate a mask image depicting one or more residue regions within the imaged portion of the field.

14. The system of claim 12, wherein, when identifying the residue piece, the computing system is further configured to:
morphologically close one or more gaps present within each of the plurality of binary images in a direction perpendicular to a dominant orientation depicted within the plurality of binary images.

15. The system of claim 14, wherein, when identifying the residue piece, the computing system is further configured to:
initially classify each pixel of the plurality of pixels within each of the plurality of binary images as one of a residue pixel associated with a specific residue piece, a non-residue pixel, or an uncertain pixel based on a distance between each pixel and an edge of one the one or more residue regions depicted within the mask image.

16. The system of claim 15, wherein, when identifying the residue piece, the computing system is further configured to:
further classify each pixel initially classified as an uncertain pixel based a proximity of each uncertain pixel to one or more pixels of the plurality of pixels initially classified as a residue pixel and one or more pixels of the plurality of pixels initially classified as a non-residue pixel.

17. The method of claim 16, wherein, when identifying the residue piece, the computing system is further configured to:
identify a perimeter of one or more residue pieces based on the classified pixels.

18. The system of claim 13, wherein:
the imaging device is supported relative to an agricultural machine such that the images of the field are captured as the agricultural machine travels across the field; and
the computing system is further configured to initiate a control action associated with adjusting an operation of an agricultural machine based on the determined length as the agricultural machine travels across the field.

* * * * *